(12) United States Patent
Kudo et al.

(10) Patent No.: US 10,768,601 B2
(45) Date of Patent: Sep. 8, 2020

(54) PROGRAMMABLE CONTROLLER

(71) Applicant: KABUSHIKI KAISHA YASKAWA DENKI, Kitakyushu-shi (JP)

(72) Inventors: Masaomi Kudo, Kitakyushu (JP); Kazumasa Ohsawa, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 871 days.

(21) Appl. No.: 14/716,997

(22) Filed: May 20, 2015

(65) Prior Publication Data
US 2015/0253756 A1 Sep. 10, 2015

Related U.S. Application Data

(63) Continuation of application No. PCT/JP2012/080099, filed on Nov. 20, 2012.

(51) Int. Cl.
*G05B 19/05* (2006.01)
*G05B 19/042* (2006.01)

(52) U.S. Cl.
CPC ....... *G05B 19/056* (2013.01); *G05B 19/0421* (2013.01); *G05B 2219/13004* (2013.01)

(58) Field of Classification Search
CPC .............. G05B 19/056; G05B 19/0421; G05B 2219/13004
(Continued)

(56) References Cited

U.S. PATENT DOCUMENTS 4,792,980 A * 12/1988 Shimizu ............... H04L 12/42
382/232
4,949,241 A * 8/1990 Iwasaki ............... G06F 9/3877
710/110
(Continued)

FOREIGN PATENT DOCUMENTS

JP 2000-112519 A 4/2000
JP 2010-061458 A 3/2010
JP 2011-123688 A 6/2011

OTHER PUBLICATIONS

International Search Report dated Jan. 22, 2013 in PCT/JP2012/080099, filed Nov. 20, 2012, 1 page.

*Primary Examiner* — Thomas C Lee
*Assistant Examiner* — Anzuman Sharmin
(74) *Attorney, Agent, or Firm* — Oblon, McClelland, Maier & Neustadt, L.L.P.

(57) ABSTRACT

A programmable controller includes multiple interface circuitry modules and multiple CPU modules. An interface circuitry module of the interface circuitry modules transmits potential signal having electric potential state of different electric potential states to a CPU module of the CPU modules, the CPU module is connectable to a second CPU module of the CPU modules and includes a CPU which performs arithmetic processing and a memory that stores discrimination and definition information, the discrimination information includes binarized information indicating whether the CPU in the CPU module is main or sub CPU, the first discrimination information is set based on the electric potential state of the potential signal input into the CPU module from the interface circuitry module to which the CPU module is connected, and the definition information includes setting information indicating whether the CPU in the CPU module is set in advance as the main CPU or sub CPU.

20 Claims, 12 Drawing Sheets

(58) Field of Classification Search
USPC ......... 318/564; 700/3, 81, 169, 170, 174, 86
See application file for complete search history.

(56) References Cited

U.S. PATENT DOCUMENTS

| | | | | |
|---|---|---|---|---|
| 5,083,072 | A * | 1/1992 | Song | G05B 19/232 |
| | | | | 318/571 |
| 5,850,338 | A * | 12/1998 | Fujishima | G05B 19/4145 |
| | | | | 700/3 |
| 6,360,333 | B1 * | 3/2002 | Jansen | G06F 11/202 |
| | | | | 709/202 |
| 6,381,693 | B2 * | 4/2002 | Fish | G06F 9/4401 |
| | | | | 713/1 |
| 6,810,010 | B1 * | 10/2004 | Matsukawa | H04L 12/40189 |
| | | | | 370/219 |
| 2002/0181799 | A1 * | 12/2002 | Matsugu | G06K 9/00281 |
| | | | | 382/260 |
| 2004/0255065 | A1 * | 12/2004 | Brudeseth | G06F 13/385 |
| | | | | 710/104 |
| 2006/0085587 | A1 * | 4/2006 | Takizawa | G06F 13/4031 |
| | | | | 710/312 |
| 2009/0083446 | A1 * | 3/2009 | Konieczny | G05B 19/052 |
| | | | | 710/2 |
| 2010/0274385 | A1 * | 10/2010 | Eriksson | G05B 19/4141 |
| | | | | 700/245 |
| 2013/0172757 | A1 * | 7/2013 | Frigstad | A61B 8/4494 |
| | | | | 600/459 |

* cited by examiner

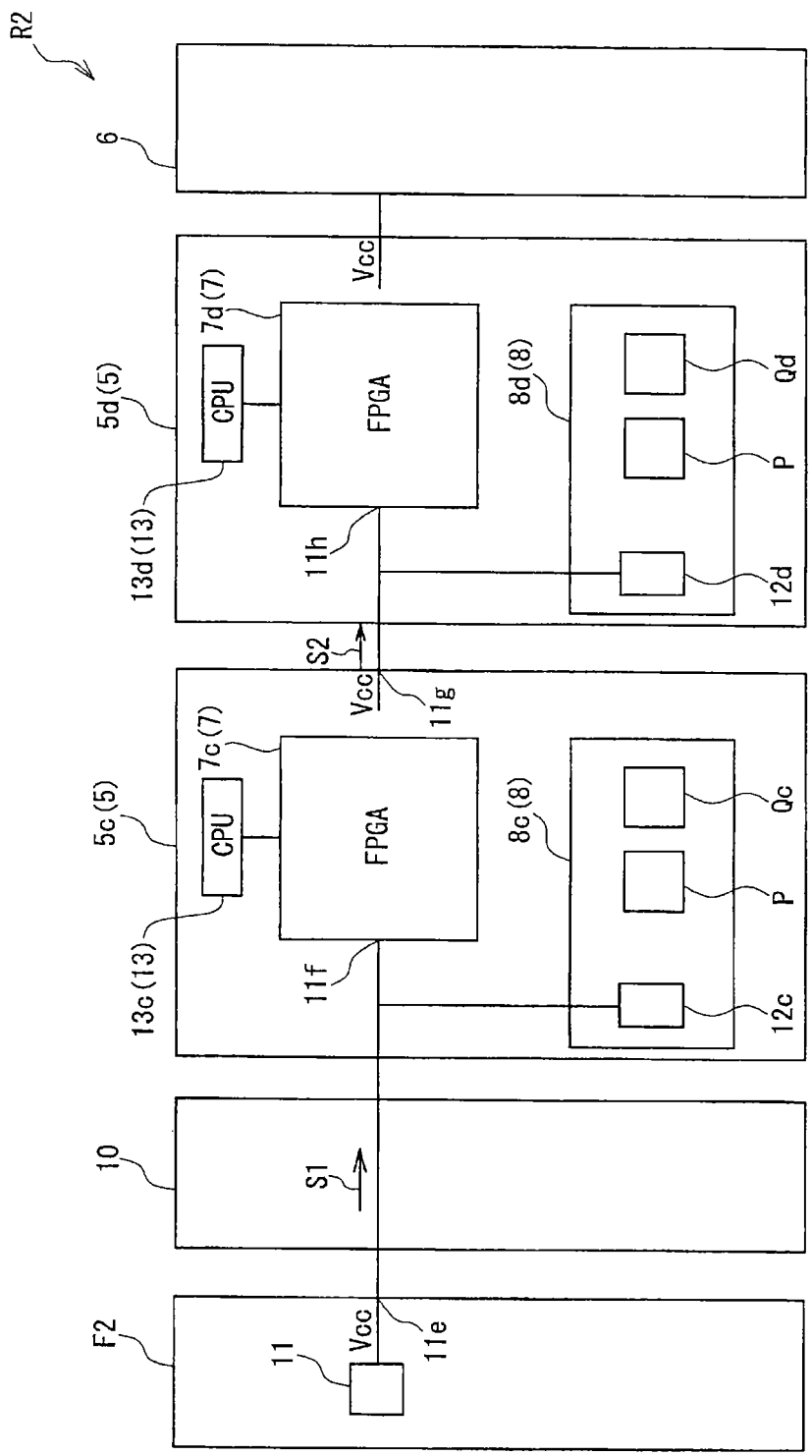

PROGRAMMABLE CONTROLLER

CROSS-REFERENCE TO RELATED APPLICATIONS

The present application is based upon and claims the benefit of priority to Japanese Patent Application No. PCT/JP2012/080099, filed Nov. 20, 2012, the entire contents of which are incorporated herein by reference.

BACKGROUND OF THE INVENTION

Field of the Invention

The present invention relates to a programmable controller.

Description of Background Art

A programmable controller of a multi-CPU configuration may include multiple CPU modules (for example, see Japanese Patent Laid-Open Publication No. 2011-123688). In Japanese Patent Laid-Open Publication No. 2011-123688, a system processor has a code switch for identifying each of the CPU modules. The entire contents of this publication are incorporated herein by reference.

SUMMARY OF THE INVENTION

According to one aspect of the present invention, a programmable controller includes multiple interface circuitry modules, and multiple CPU modules. An interface circuitry module of the interface circuitry modules transmits a potential signal having an electric potential state of different electric potential states to a CPU module of the CPU modules, the CPU module is connectable to a second CPU module of the CPU modules and includes a CPU which performs arithmetic processing and a memory that stores discrimination information and definition information, the discrimination information including binarized information indicating whether the CPU in the CPU module is a main CPU or a sub CPU, the first discrimination information being set based on the electric potential state of the potential signal that is input into the CPU module from the interface circuitry module to which the CPU module is connected, and the definition information including setting information indicating whether the CPU in the CPU module is set in advance as the main CPU or the sub CPU.

According to another aspect of the present invention, a method for controlling a servo motor includes executing arithmetic processing via multiple CPU modules connected to multiple interface circuitry modules, generating a control command based on the arithmetic processing, and transmitting the control command to a servo control device that executes operation and control of a servo motor. An interface circuitry module of the interface circuitry modules transmits a potential signal having an electric potential state of different electric potential states to a CPU module of the CPU modules, the CPU module is connectable to a second CPU module of the CPU modules and includes a CPU which performs arithmetic processing and a memory that stores discrimination information and definition information, the discrimination information includes binarized information indicating whether the CPU in the CPU module is a main CPU or a sub CPU, the first discrimination information is set based on the electric potential state of the potential signal that is input into the CPU module from the interface circuitry module to which the CPU module is connected, and the definition information includes setting information indicating whether the CPU in the CPU module is set in advance as the main CPU or the sub CPU.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a flowchart that describes operation of the PLC when power is turned on;

FIG. 12 is a block diagram illustrating a schematic configuration of a CPU module that is connected to an IF unit in a CPU rack in the third embodiment.

DETAILED DESCRIPTION OF THE EMBODIMENTS

Figure 1:
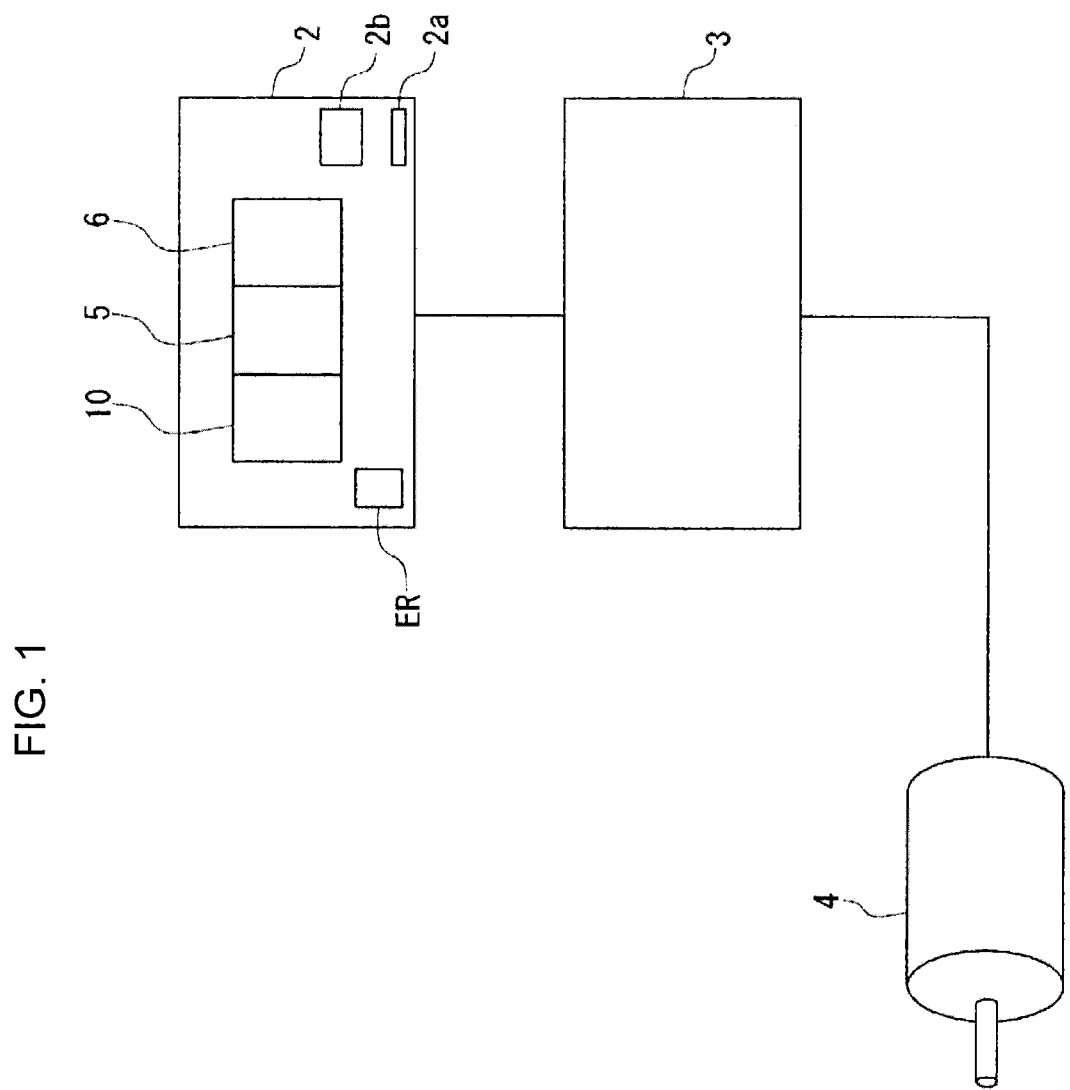
FIG. 1 illustrates a state in which a programmable controller (PLC) according to a first embodiment of the present invention is used.

The embodiments will now be described with reference to the accompanying drawings, wherein like reference numerals designate corresponding or identical elements throughout the various drawings.

First Embodiment

In the following, a first embodiment of the present invention is described using the drawings. FIG. 1 illustrates a state in which a programmable controller (PLC) 2 according to the first embodiment of the present invention is used. The programmable controller 2 is used by being connected via a servo control device 3 to a servo motor 4 as a control object. Of course, the control object is not limited to the servo motor 4. Various other types of motors and various actuators other than motors can be control objects.

The PLC 2 is structured to have multiple modules such as power source modules 10, CPU (central processing unit) modules 5 and option modules 6. Each of the CPU modules 5 has a memory. The memories each store a control program. When the control program is executed, based on arithmetic processing of the CPU module 5, a control command is transmitted from the PLC 2 to the servo control device 3.

Based on the received control command, the servo control device 3 executes operation control and driving of the servo motor (control object) 4.

The PLC 2 has a data communication port (2a) such as a USB port. By connecting an external storage device such as a USB memory to the data communication port (2a), data, setting information and the like in the PLC 2 can be backed up. Further, the PLC 2 has a data communication port (2b) such as an Ethernet port. By connecting the PLC 2 via the data communication port (2b) to a PC that has a program editing application such as an engineering tool, reading, editing and writing of a control program in the PLC 2 can be performed via the PC. The PLC 2 has an error display (error display means) (ER) that performs error display when content based on a discrimination bit (to be described later) and content based on definition information do not match.

Figure 2:
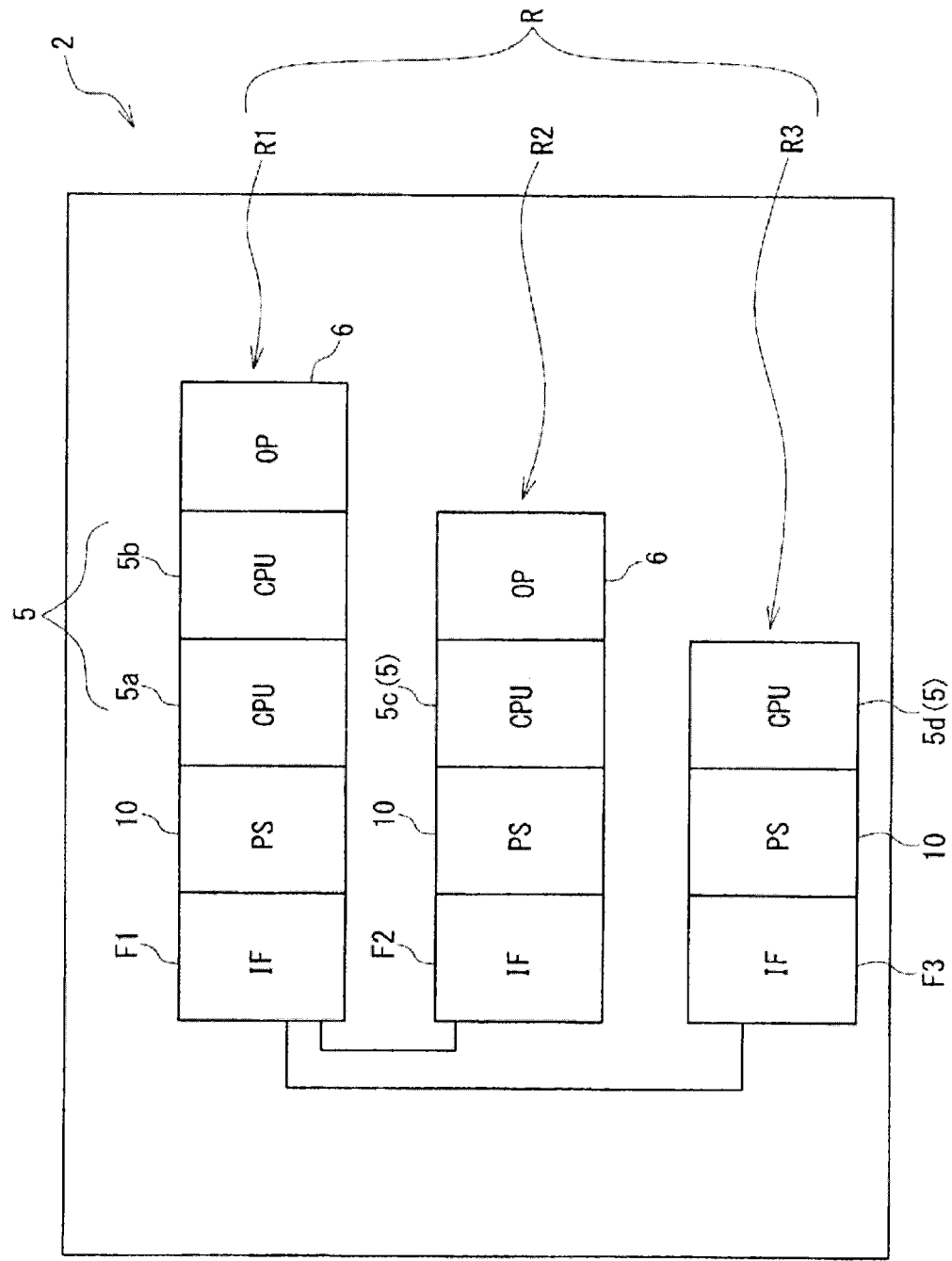
FIG. 2 is a block diagram illustrating a schematic configuration of the PLC illustrated in FIG. 1.

FIG. 2 is a block diagram illustrating a schematic configuration of the PLC 2. The PLC 2 has multiple CPU racks (R). The CPU racks (R) each have a power source module 10 and a CPU module 5. Several types of modules are prepared as option modules 6. Some of the CPU racks (R) may each have an option module 6. For example, according to a control device, a module suitable for an application may be selected from a lineup of modules and used as an option module in the PLC 2. The lineup of the modules includes communication modules (for RS-232C communication, Devicenet communication and the like), servo control modules, I/O modules, and the like.

In FIG. 2, a CPU rack (R1) has a power source module 10, two CPU modules (5a, 5b), and an option module 6. A CPU rack (R2) has a power source module 10, one CPU module (5c), and an option module 6. A CPU rack (R3) has a power source module 10, and one CPU module (5d). The CPU modules (5a-5d) have the same configuration.

The CPU racks (R1-R3) respectively have inter-rack interface units (interface units; hereinafter, referred to as IF units) (F1-F3). The IF units have functions to connect the CPU racks with each other via the IF units. In FIG. 2, the CPU rack (R1) and the CPU rack (R2) are connected via the IF unit (F1) and the IF unit (F2). The CPU rack (R1) and the CPU rack (R3) are connected via the IF unit (F1) and the IF unit (F3).

The IF unit (F1) is connected via the power source module 10 to the CPU module (5a). The CPU module (5b) is connected to the CPU module (5a). The IF unit (F2) is connected via the power source module 10 to the CPU module (5c). The IF unit (F3) is connected via the power source module 10 to the CPU module (5d). The IF units (F1-F3) each have a function to set a CPU module that is connected to the IF unit as a main CPU or a sub CPU depending on whether or not the IF unit has therein a slave rack extension module 11.

Figure 3:
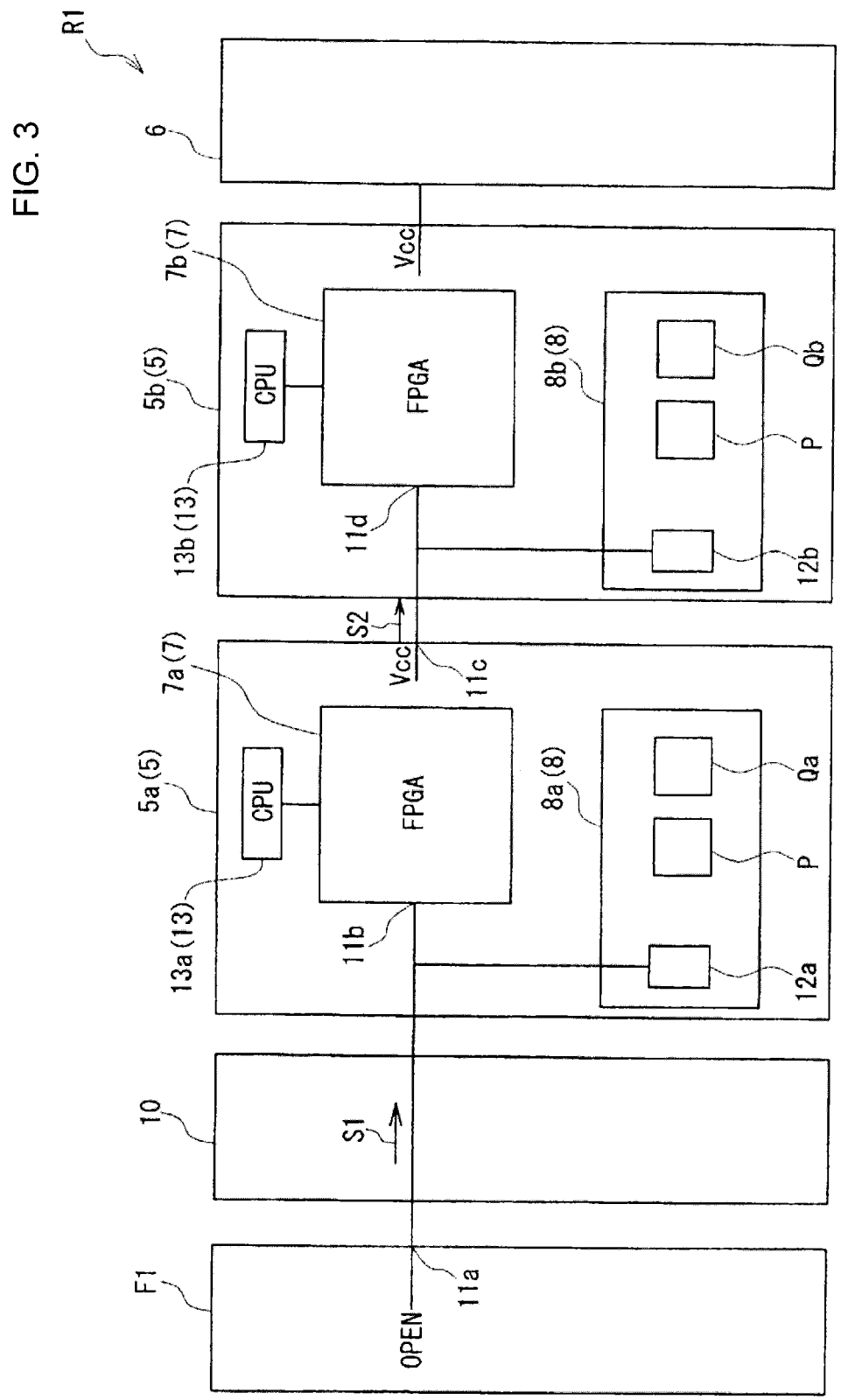
FIG. 3 is a block diagram illustrating a schematic configuration of a CPU module that is connected to an IF unit in a CPU rack.
Figure 4:
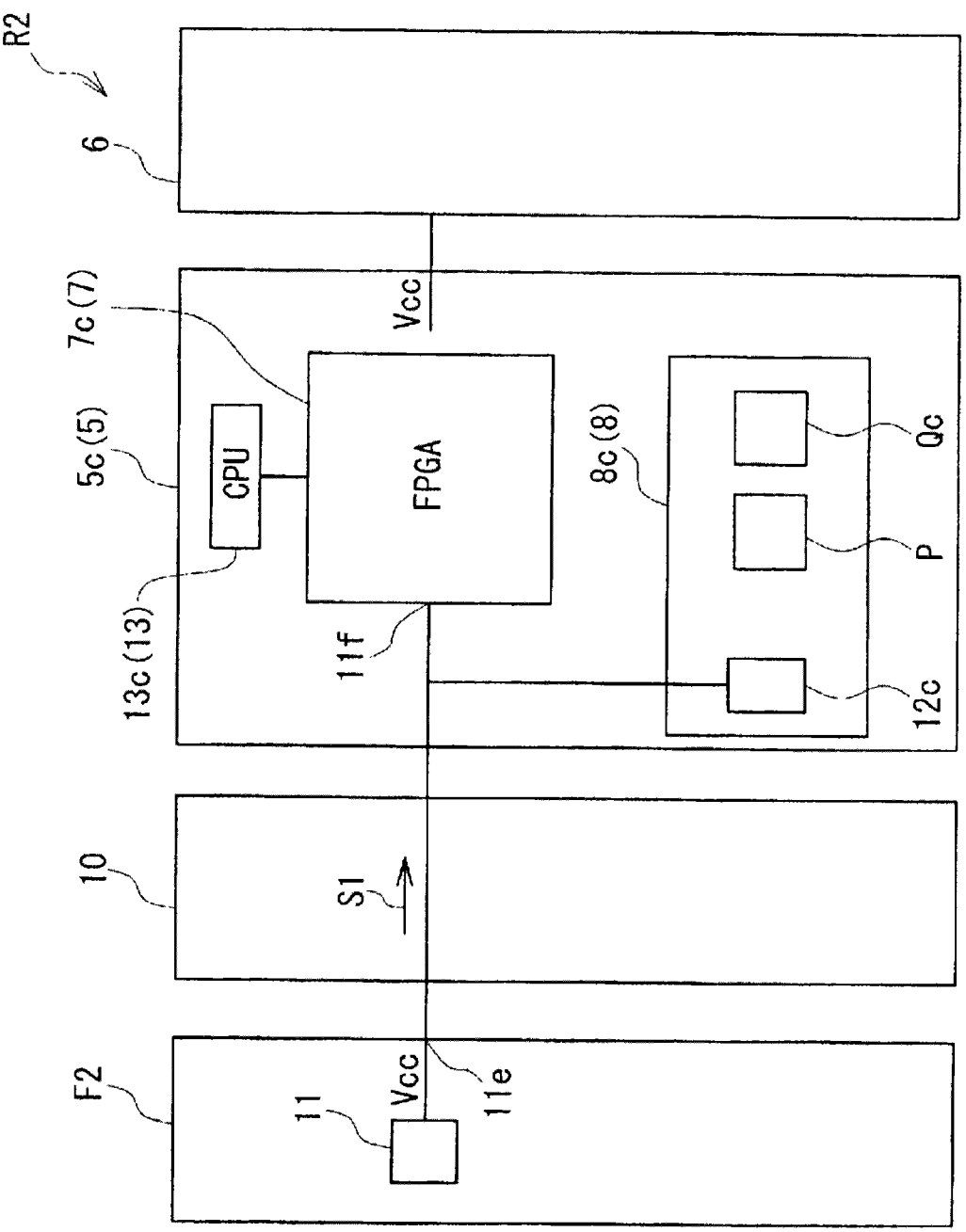
FIG. 4 is a block diagram illustrating a schematic configuration of a CPU module that is connected to an IF unit in another CPU rack.

FIG. 3 is a block diagram illustrating a schematic configuration of the CPU module (5a) that is connected to the IF unit (F1) in the CPU rack (R1). FIG. 4 is a block diagram illustrating a schematic configuration of the CPU module (5c) that is connected to the IF unit (F2) in the CPU rack (R2). The CPU module 5 has a CPU (central processing unit) 13, an FPGA 7 and a memory 8. The CPU 13 is a processor that executes various applications. The FPGA 7 is an integrated circuit that incorporates a circuit that is specialized for a system, and has a function of executing processing such as generating a scan period based on execution of a control program (P). The control program (P) is stored in the memory 8. The CPU 13 performs arithmetic processing by executing the control program (P), and operation of the servo motor 4 is controlled based on an arithmetic result of the arithmetic processing.

The IF unit (F1) does not have a slave rack extension module 11. Therefore, a potential state of the connection port (11a) that is connected to the CPU (5a) is OPEN. A potential level of the connection port (11b) that is connected to the connection port (11a) is the same as a potential level of the connection port (11a). Further, the potential level of the connection port (11b) and a potential level of the discrimination bit (12a) are the same level. Therefore, the potential level of the connection port (11b) and the potential level of the discrimination bit (12a) both are the same as the potential level of the connection port (11a) (hereinafter, this state is referred to as an OPEN state). The connection port (11a) of the IF unit (F1) is connected via the power source module 10 to the connection port (11b) that is provided to a FPGA (7a) in the CPU module (5a). Consequently, a first potential signal (S1) is input from the IF unit (F1) to the CPU module (5a). When the potential state of the connection port (11a) is the OPEN state, a potential state of the first potential signal (S1) that is input to the connection port (11b) is determined by the potential level of the discrimination bit (12a) and thus is Low Level.

The CPU module (5a) has the discrimination bit (12a) in the memory (8a). The discrimination bit (12a) has binarized information indicating whether a CPU (13a) in the CPU module (5a) of itself is a main CPU or a sub CPU. The information is based on the potential state of the first potential signal (S1) that is input to the connection port (11b). For example, in the present first embodiment, when the potential state of the first potential signal (S1) that is input to the connection port of the FPGA is Low, the discrimination bit is "0" and the CPU module is set as a main CPU. When the potential state of the first potential signal (S1) that is input to the connection port of the FPGA is High, the discrimination bit is "1" and the CPU module is set as a sub CPU.

In the CPU module (5a), a potential state of an input potential to the connection port (11b) of the FPGA (7a) is Low Level. Therefore, the discrimination bit (12a) is "0" and the CPU (13a) in the CPU module (5a) is set as a main CPU. When the CPU (13a) is set as a main CPU, the setting information (the information that the CPU (13a) is a main CPU) is stored as definition information (Qa) in the memory (8a). When the control program (P) is executed, an operation clock signal of the CPU module (5a) as a main CPU becomes a reference clock signal of the program execution. Therefore, the clock signal of the CPU module (5a) is transmitted to other sub CPUs. The CPU modules (5b-5d) also each generate a clock signal.

The CPU module (5a) has an output port (11c). A potential state (predetermined potential state) of a second potential signal (S2) that is output from the output port (11c) is Vcc. The CPU module (5b) has therein an FPGA (7b). The output port (11c) is connected to a connection port (11d) of the FPGA (7b). A potential state of the output port (11c) is Vcc Level. Therefore, the potential state of the second potential signal (S2) that is input to the connection port (11d) is High Level.

The CPU module (5b) has a discrimination bit (12b) in a memory (8b). The discrimination bit (12b) has configuration and function that are the same as those of the discrimination bit (12a). In the CPU module (5b), the potential state of the second potential signal (S2) that is input to the connection port (11d) of the FPGA (7b) is High Level. Therefore, the discrimination bit (12a) is "1" and a CPU (13b) in the CPU module (5b) is set as a sub CPU. When the CPU (13b) is set as a sub CPU, the setting information (the information that the CPU (13b) is a sub CPU) is stored as definition information (Qb) in the memory (8b). When the control program (P) is executed, an operation clock signal of the CPU module (5a) as a main CPU becomes a reference clock signal of the program execution. An operation clock signal of the CPU module (5b) as a sub CPU is synchronized with a clock signal received from the CPU module (5a) as a main CPU.

As described above, the IF unit (F1) does not have the slave rack extension module 11. Therefore, the CPU module (5a) that is connected to the IF unit (F1) is set as a main CPU. The CPU module (5b) that is connected to the CPU module (5a) (in other words, a CPU module that is not directly connected to an IF unit but is connected to another CPU module) is set as a sub CPU.

When the input potential to the connection port of the FPGA is one of High Level and Low Level, to set the CPU of the CPU module as a main CPU or a sub CPU is a matter of freedom in design. Further, when the input potential to the connection port of the FPGA is one of High Level and Low Level, to set an information value of the discrimination bit to "0" or "1" is also a matter of freedom in design.

The IF unit (F2) has therein the slave rack extension module 11. Therefore, the potential state of the first potential signal (S1) that is input to a connection port (11e) connected to the CPU (5c) is Vcc Level. The connection port (11e) of the slave rack extension module 11 is connected via the power source module 10 to a connection port (11f) that is provided to a FPGA (7c) in the CPU module (5c). When a potential of the connection port (11e) is Vcc Level, the potential state of the first potential signal (S1) that is input to the connection port (11f) is High Level.

The CPU module (5c) has a discrimination bit (12c) in a memory (8c). The discrimination bit (12c) has configuration and function that are the same as those of the discrimination bit (12a). In the CPU module (5c), an input potential to the connection port (11f) of the FPGA (7c) is High Level. Therefore, the discrimination bit (12c) is "1" and a CPU (13c) in the CPU module (5c) is set as a sub CPU. When the CPU (13c) is set as a sub CPU, the setting information (the information that the CPU (13c) is a sub CPU) is stored as definition information (Qc) in the memory (8c). When the control program (P) is executed, an operation clock signal of the CPU module (5a) as a main CPU becomes a reference clock signal of the program execution. An operation clock signal of the CPU module (5c) as a sub CPU is synchronized with a clock signal received from the CPU module (5a) as a main CPU.

As described above, when the IF unit (F2) has the slave rack extension module 11, the CPU module (5c) that is connected to the IF unit (F2) is set as a sub CPU. A CPU module connected to the CPU module (5c) is also set as a sub CPU. A connection state between the IF unit (F3) and the CPU module (5d) and settings of the CPU module (5d) are the same as a connection state between the IF unit (F2) and the CPU module (5c) and settings of the CPU module (5c), and thus a description thereof is omitted. That is, the IF unit (F3) has the slave rack extension module 11. Therefore, a discrimination bit (12d) is "1" and the CPU module (5d) is set as a sub CPU. The information that the CPU module (5d) is a sub CPU is stored as definition information (Qd) in a memory (8d) (illustration of the discrimination bit (12d), the definition information (Qd) and the memory (8d) in the drawings is omitted in the present first embodiment).

As described above, despite of being CPU modules of the same configuration, the CPU modules (5a-5d) can each be automatically set as a main CPU or a sub CPU depending on a connection state with an IF unit. Depending on which IF unit a CPU module is connected to, that is, depending on whether a CPU module is connected to an IF unit that has a slave rack extension module or an IF unit that does not have a slave rack extension module, the CPU module is automatically set as a main CPU or a sub CPU, and the setting content is stored as definition information in the CPU module.

The PLC 2 performs a hardware connection state detection operation and a definition information confirmation operation after power is turned on. In the hardware connection state detection operation, detection of connection states between the CPU racks (R1-R3), detection of presence or absence of a slave rack extension module in each of the IF units, detection of connection states of the CPU modules, and the like, are performed. In the detection of the connection states of the CPU modules, detection is performed regarding which IF unit or which CPU module each of the CPU modules is connected to. By the hardware connection state detection operation, connection states between the IF units and the CPU modules are detected. Based on the connection situation in the PLC 2, a CPU module to be set as a main CPU (this is referred to as a CPU module of which a connection state is "main") and a CPU module to be set as a sub CPU (this is referred to as a CPU module of which a connection state is "sub") are identified.

In the definition information confirmation operation, confirmation of the setting content of the definition information in each of the CPU modules is performed. That is, setting information is obtained regarding which CPU module is set in advance as a main CPU (this is referred to as a CPU module of which definition information is "main") and which CPU module is set in advance as a sub CPU (this is referred to as CPU module of which definition information is "sub").

When there is no contradiction between a CPU module of which the connection state is "main" and a CPU module of which the definition information is "main" and there is no contradiction between a CPU module of which the connection state is "sub" and a CPU module of which the definition information is "sub," the PLC 2 is in a normally operable state. When the PLC 2 is in the normally operable state, a scan operation based on the execution of the control program (P), data backup processing via the data communication port (2a) that the PLC 2 has, reading, editing and writing of the control program using a program editing application, and the like, can be performed.

On the other hand, when there is a contradiction between the connection state and the definition information of a CPU module, the PLC 2 is not in the normally operable state. In this case, some functions such as the data backup processing via the data communication port (2a), the reading of the control program and a monitor of a register in the control program are effective, but some other functions such as the scan operation based on the execution of the control program (P) and the writing of the control program via the data communication port (2a) are ineffective.

Figure 5:
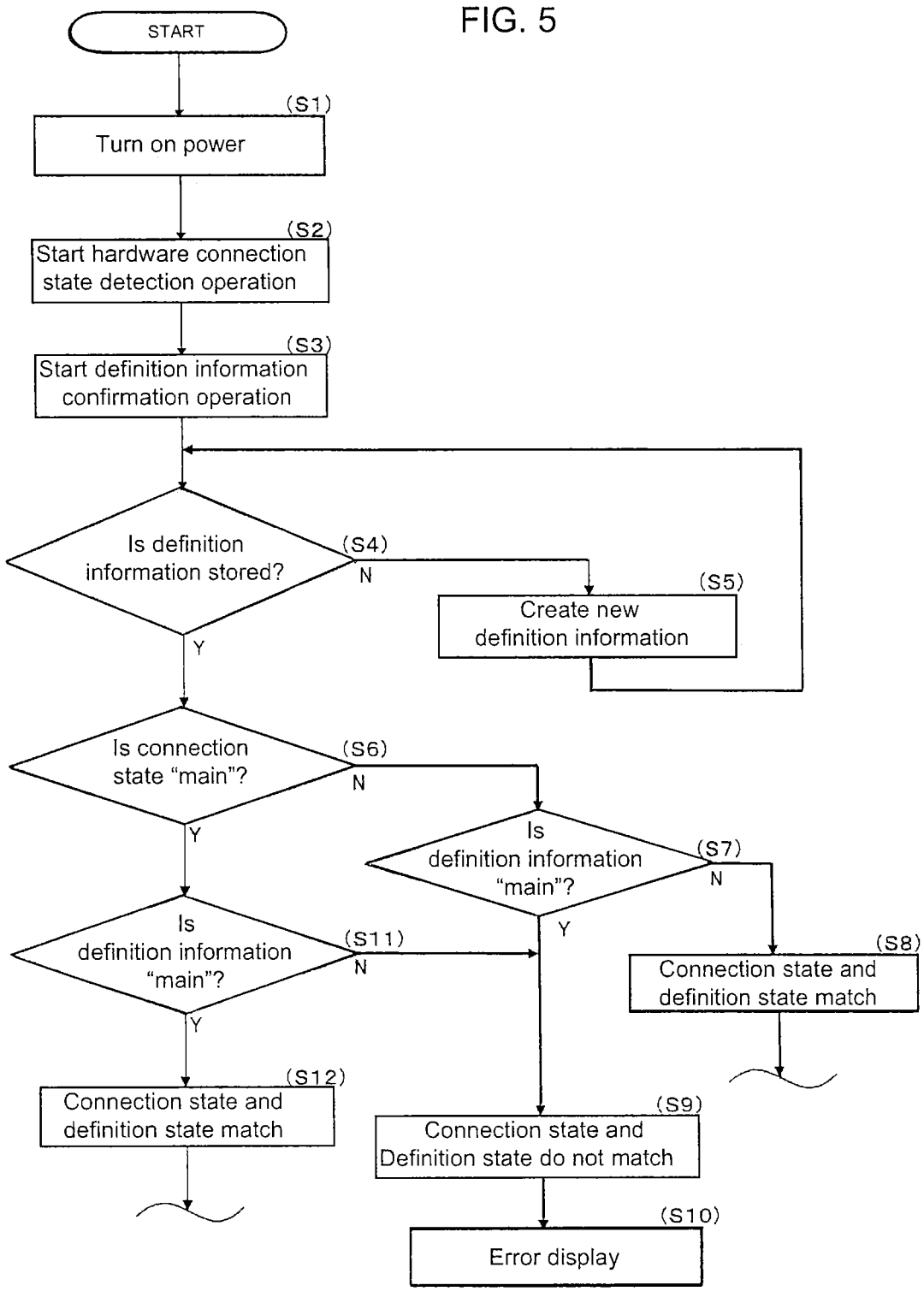

Operation of the PLC 2 is described using flowcharts of FIG. 5-8. FIG. 5 is a flowchart that describes the operation of the PLC 2 when power is turned on. When the power of the PLC 2 is turned on (S1), the PLC 2 starts the hardware connection state detection operation (S2). Next, the PLC 2 starts the definition information confirmation operation (S3). By these operations, the connection states of the IF units (F1-F3) and the CPU modules (5a-5d), presence or absences of the lave rack extension module 11, and contents of the definition information (Qa-Qd) are confirmed.

When the definition information (Qa-Qd) is not stored in any of the memories (8a-8d) (S4), that is, when none of the definition information (Qa-Qd) has any content, it is determined that all the CPU modules (5a-5d) are "unused." In this case, new definition information (Qa-Qd) is created in the memories (8a-8d) of the CPU modules (5a-5d) (S5). Specifically, in a CPU module of which the connection state is "main," that the CPU module is "main" is stored as the definition information. In a CPU module of which the connection state is "sub," that the CPU module is "sub" is stored as the definition information. Then, the PLC 2 is in the normally operable state.

When the definition information (Qa-Qd) is stored in any one of the memories (8a-8d) (S4), whether or not the connection state is "main" is confirmed (S6). When the connection state is not "main," whether or not the definition information stored in the CPU module is "main" is confirmed (S7). When the definition information is also not "main," it is determined that the connection state and the definition state match (that is, both are "sub") (S8). When the definition information is "main," it is determined that the connection state and the definition state do not match (S9), and error display is performed, for example, in the error display (error notification means) (ER) that the PLC 2 has (S10). In this case, the PLC 2 is not in the normally operable state.

When the connection state is "main" (S6), whether or not the definition information stored in the CPU module is "main" is confirmed (S11). When the definition information is also "main," it is determined that the connection state and the definition state match (that is, both are "main") (S12). When the definition information is "sub," it is determined that the connection state and the definition state do not match (S9), and error display is performed, for example, in the error display (ER) that the PLC 2 has (S10). In this case, the PLC 2 is not in the normally operable state.

The above matching operation between the connection state and the definition information is performed for all the CPU modules. When it is determined that the connection state and the definition information match for all the CPU modules, the PLC 2 is in the normally operable state.

Figure 6:
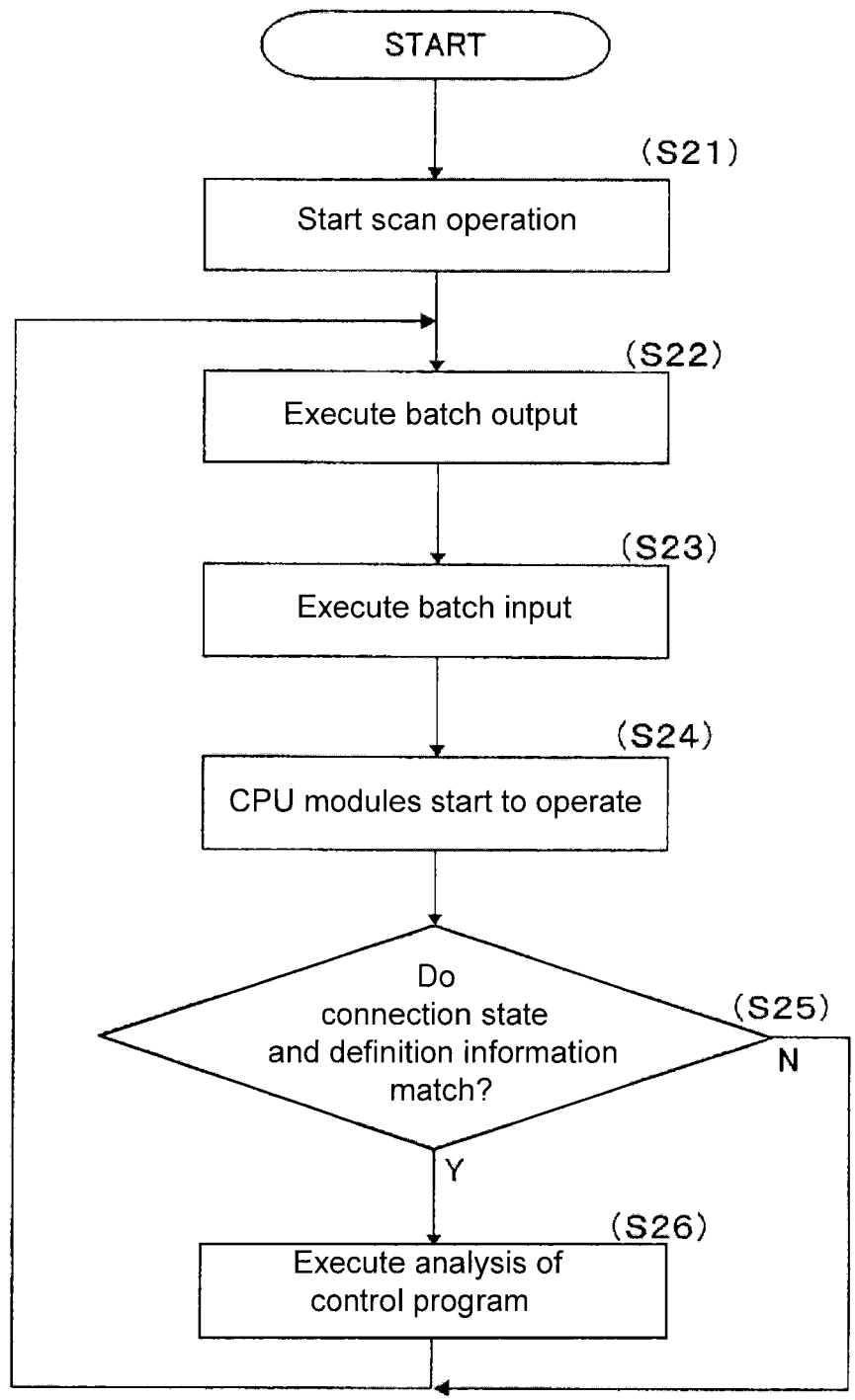
FIG. 6 is a flowchart that describes operation of the PLC when program scan is performed.

Next, the operation of the PLC 2 when program scan is performed is described using FIG. 6. When a scan operation is started (S21), batch output (S22) and batch input (S23) are performed. Here, the batch output means that content of an output register that has been set by a ladder program (control program written in a ladder language) is output to an external device; and the batch input means that input from an external device is incorporated into an input register. Next, the CPU modules (5a-5d) each start to operate (S24). First, match or mismatch between the connection state and the definition information of each of the CPU modules is confirmed (S25). The confirmation process of match or mismatch between the connection state and the definition information of each of the CPU modules is as described in FIG. 5.

When it is determined that the connection state and the definition information of each of the CPU modules match, analysis of the control program (P) (for example, written in the ladder language) is executed (S26), and operation control of the servo motor 4 based on the control program (P) is performed. Here, a clock signal of a CPU module that has been set as a main CPU is transmitted to a CPU module that has been set as a sub CPU. The sub CPU operates while synchronized with the clock signal of the main CPU.

Figure 7:
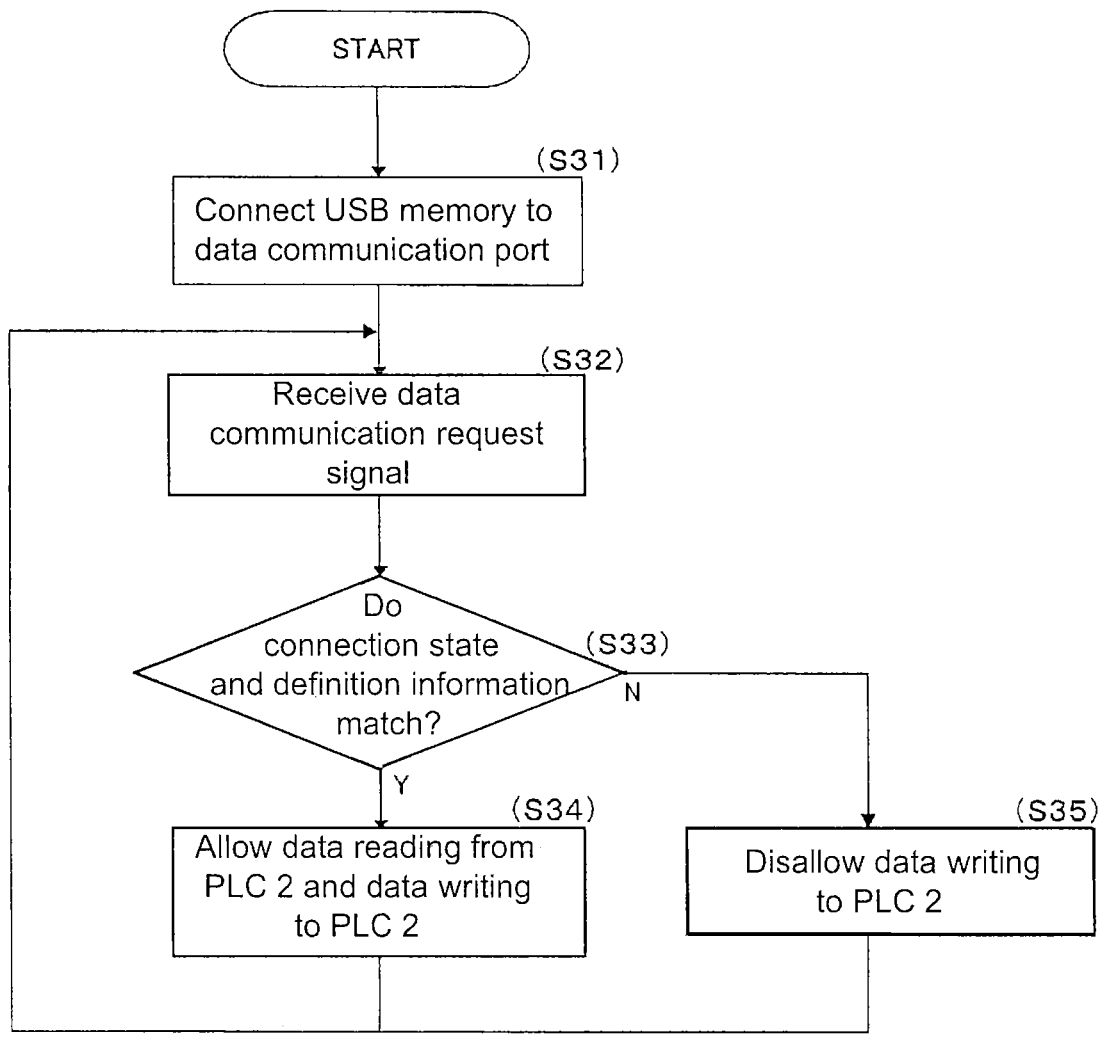
FIG. 7 is a flowchart that describes data backup procedures of the PLC.

Next, data backup procedures of the PLC 2 are described using FIG. 7. A USB memory (external storage device) is connected to the data communication port (2a) (S31). When a data communication request signal for communicating with the USB memory is received (S32), the PLC 2 first confirms match or mismatch between the connection state and the definition information of each of the CPU modules (S33). The confirmation process of match or mismatch between the connection state and the definition information of each of the CPU modules is as described in FIG. 5.

When it is determined that the connection state and the definition information of each of the CPU modules match, data backup from the PLC 2 to the USB memory (data reading from the PLC 2) and data loading from the USB memory to the PLC 2 (data writing to the PLC 2) are allowed (S34). On the other hand, when it is determined that the connection state and the definition information of each of the CPU modules do not match, only data reading from the PLC 2 is allowed, but data writing to the PLC 2 is not allowed (S35).

Figure 8:
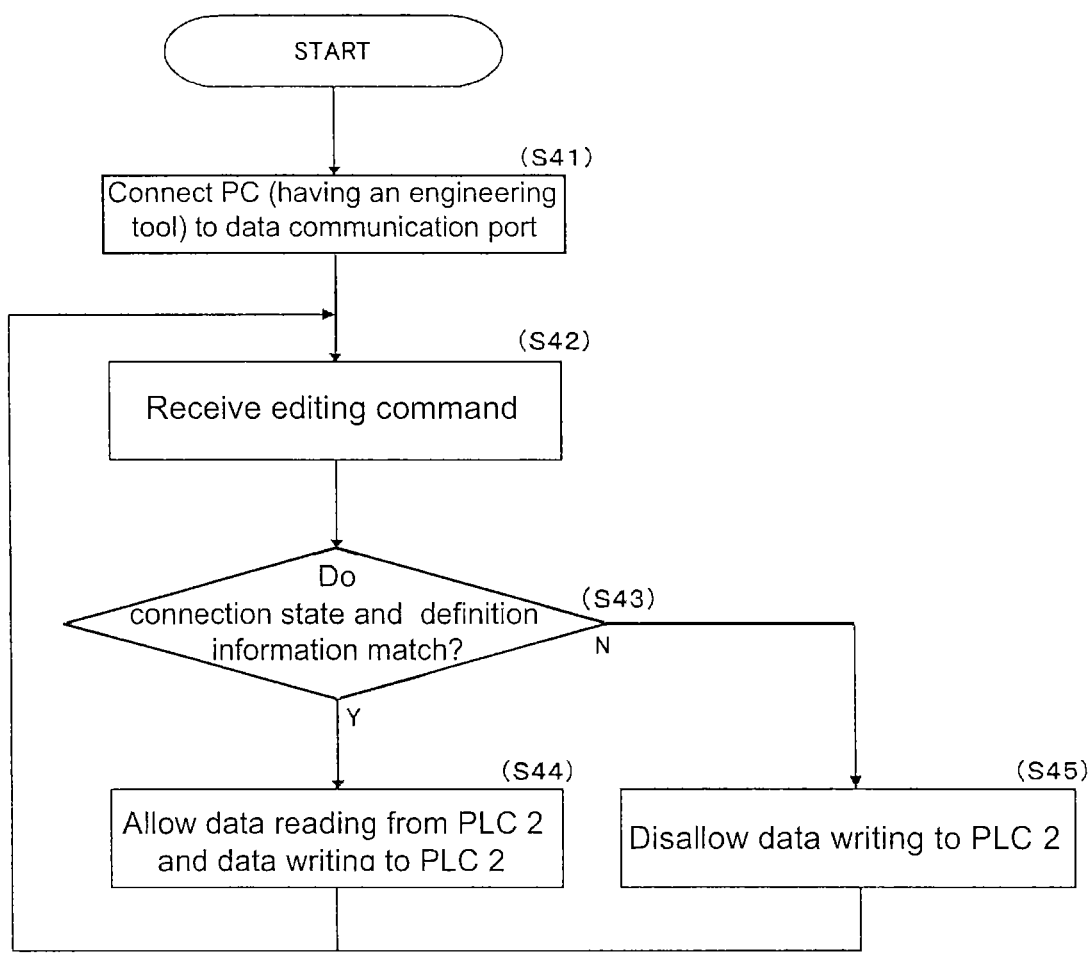
FIG. 8 is a flowchart that describes editing procedures of a control program using an engineering tool (program editing application)

Next, editing procedures of the control program (P) using an engineering tool (program editing application) are described using FIG. 8. A PC having an engineering tool is connected to the data communication port (2a) (S41). When an editing command is received from the PC side (S42), the PLC 2 first confirms match or mismatch between the connection state and the definition information of each of the CPU modules (S43). The confirmation process of match or mismatch between the connection state and the definition information of each of the CPU modules is as described in FIG. 5.

When it is determined that the connection state and the definition information of each of the CPU modules match, both data reading from the PLC 2 to the PC and data writing from the PC to the PLC 2 by the engineering tool are allowed (S44). On the other hand, when it is determined that the connection state and the definition information of each of the CPU modules do not match, only data reading from the PLC 2 to the PC is allowed, but data writing to the PLC 2 is not allowed (S45).

Second Embodiment

Figure 9:
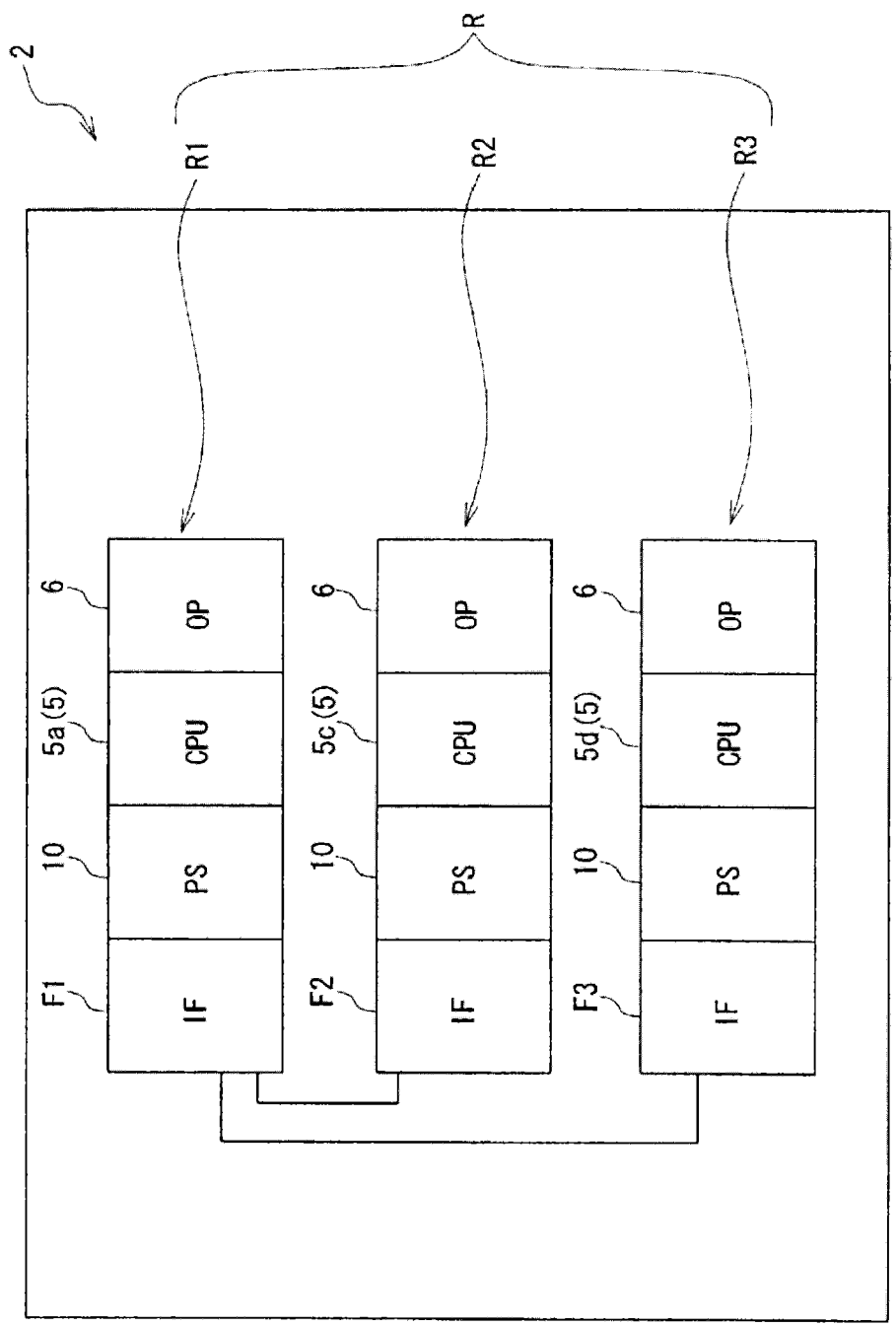
FIG. 9 is a block diagram illustrating a schematic configuration of a PLC 2 according to a second embodiment.

FIG. 9 is a block diagram illustrating a schematic configuration of a PLC 2 according to a second embodiment. The PLC 2 has multiple CPU racks (R1-R3). The CPU racks (R1-R3) respectively have IF units (F1-F3), power source modules 10, CPU modules 5 and option modules 6. In FIG. 9, the CPU rack (R1) has one CPU module (5a), the CPU rack (R2) has one CPU module (5c), and the CPU rack (R3) has one CPU module (5d). The CPU modules (5a, 5c, 5d) have the same configuration.

Figure 10:
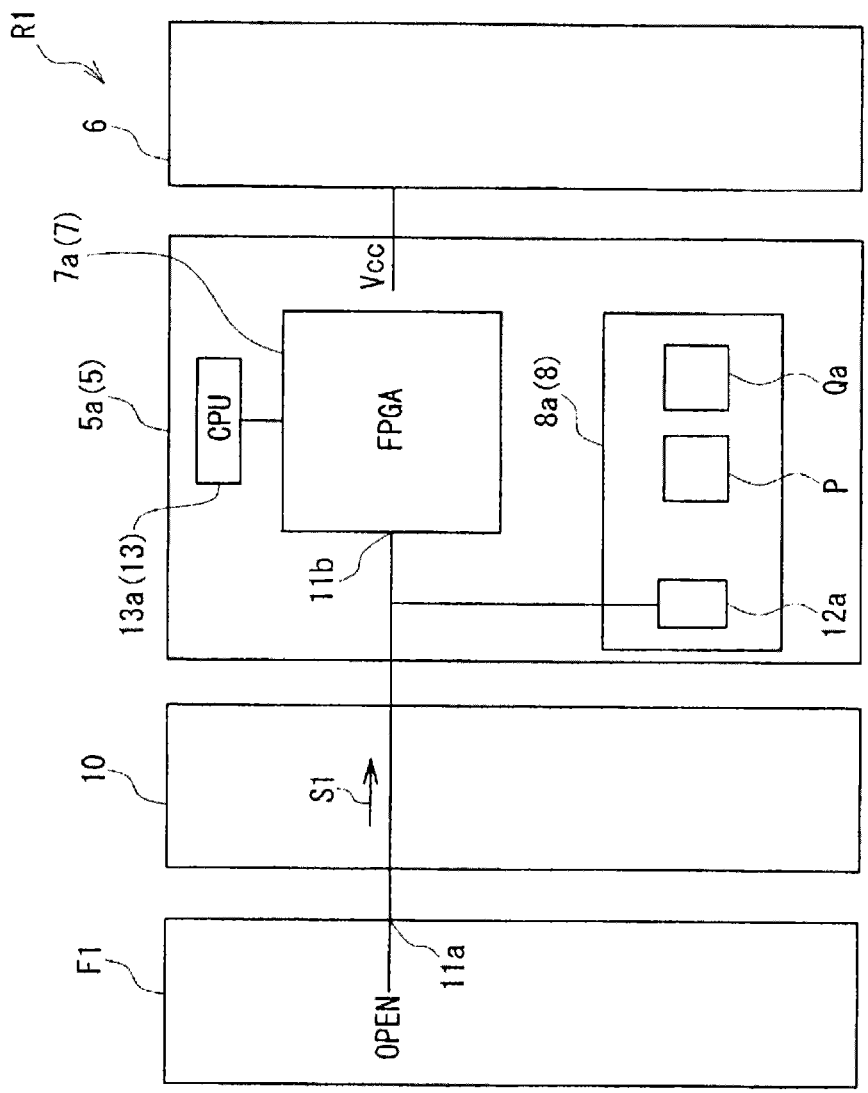
FIG. 10 is a block diagram illustrating a schematic configuration of a CPU module that is connected to an IF unit in a CPU rack in the second embodiment.

FIG. 10 is a block diagram illustrating a schematic configuration of the CPU module (5a) that is connected to the IF unit (F1) in the CPU rack (R1). The CPU module (5a) has a discrimination bit (12a) in a memory (8a). The discrimination bit (12a) has configuration and function that are the same as described in the first embodiment. In the CPU module (5a), the IF unit (F1) does not have a slave rack extension module 11. Therefore, a potential state of the connection port (11a) is an OPEN state. Therefore, an input potential to a connection port (11b) of an FPGA (7a) due to a first potential signal (S1) is Low Level, the discrimination bit (12a) is "0" and a CPU (13a) in the CPU module (5a) is set as a main CPU. When the CPU (13a) is set as a main CPU, the setting information (the information that the CPU (13a) is a main CPU) is stored as definition information (Qa)

in the memory (8a). When the control program (P) is executed, an operation clock signal of the CPU module (5a) as a main CPU becomes a reference clock signal of the program execution.

In the CPU rack (R2), the IF unit (F2) has a slave rack extension module 11. Therefore, the CPU module (5c) is set as a sub CPU. In the CPU rack (R3), the IF unit (F3) has a slave rack extension module 11. Therefore, a CPU (13d) in the CPU module (5d) is set as a sub CPU. In the CPU racks (R2, R3), a process in which the CPU modules (5c, 5d) are each set as a sub CPU is the same as that described regarding the CPU rack (R2) and the CPU module (5c) in the first embodiment and that described in FIG. 4, and thus a detailed description thereof is omitted. When the control program (P) is executed, an operation clock signal of the CPU module (5c) as a sub CPU is synchronized with a clock signal received from the CPU module (5a) as a main CPU.

Third Embodiment

Figure 11:
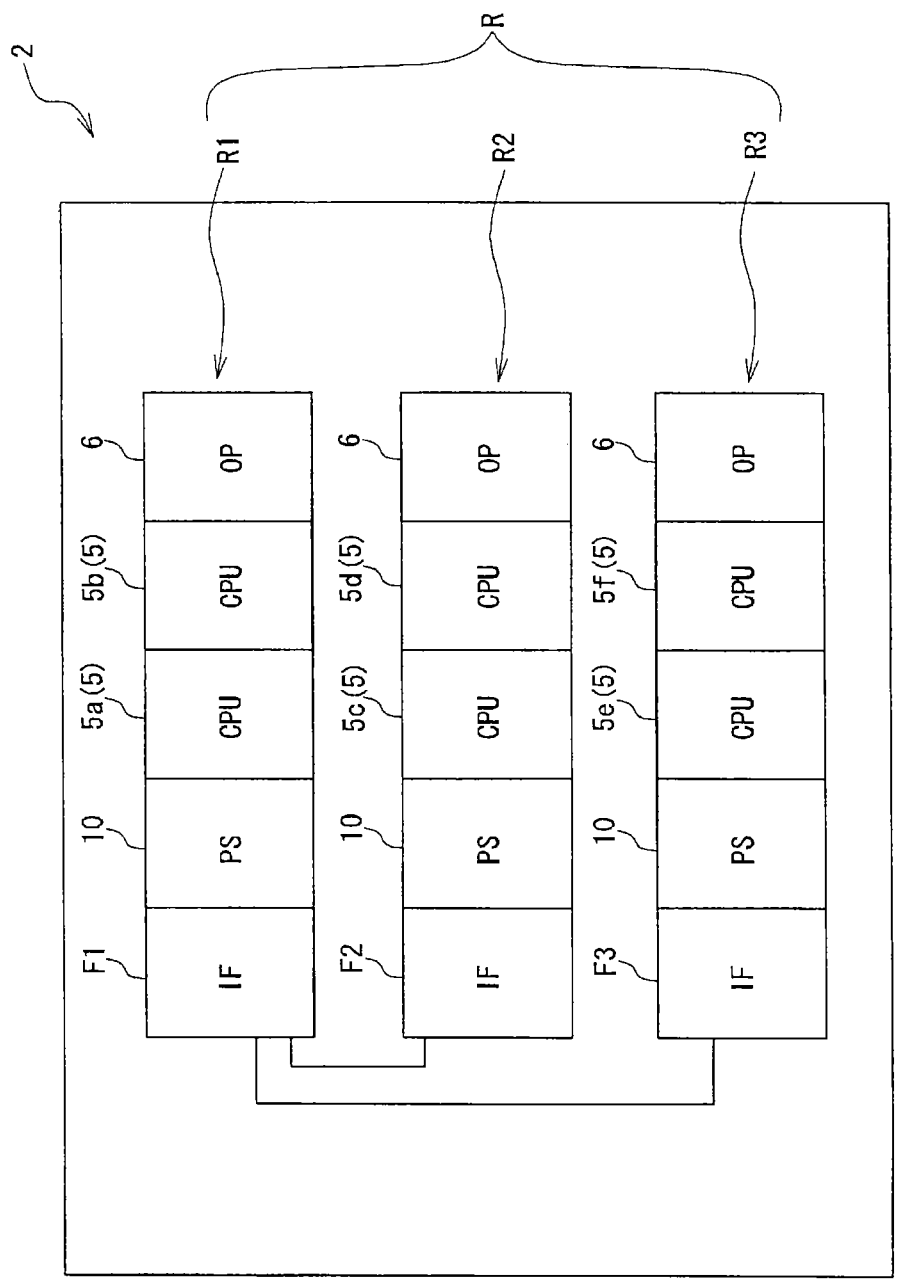
FIG. 11 is a block diagram illustrating a schematic configuration of a PLC 2 according to a third embodiment.

FIG. 11 is a block diagram illustrating a schematic configuration of a PLC 2 according to a third embodiment. The PLC 2 has multiple CPU racks (R1-R3). The CPU racks (R1-R3) respectively have IF units (F1-F3), power source modules 10, CPU modules 5 and option modules 6. In FIG. 11, the CPU rack (R1) has two CPU modules (5a, 5b), the CPU rack (R2) has two CPU modules (5c, 5d), and the CPU rack (R3) has two CPU modules (5e, 5f). The CPU modules (5a-5f) have the same configuration.

In the CPU rack (R1), the IF unit (F1) does not have a slave rack extension module 11. Therefore, a CPU (13a) in the CPU module (5a) is set as a main CPU. Further, a CPU (13b) in the CPU module (5b) that is connected to the CPU module (5a) that is a main CPU is set as a sub CPU. A process in which each of these is set is the same as that described regarding the CPU rack (R1) and the CPU modules (5a, 5b) in the first embodiment and that described in FIG. 3, and thus a detailed description thereof is omitted. When the control program (P) is executed, an operation clock signal of the CPU module (5a) as a main CPU becomes a reference clock signal of the program execution. An operation clock signal of the CPU module (5b) as a sub CPU is synchronized with a clock signal from the CPU module (5a) as a main CPU.

FIG. 12 is a block diagram illustrating a schematic configuration of the CPU module (5c) that is connected to the IF unit (F2) in the CPU rack (R2). The CPU module (5c) has a discrimination bit (12c) in a memory (8c). The discrimination bit (12c) has configuration and function that are the same as described in the first embodiment. In the CPU module (5c), the IF unit (F2) does not have a slave rack extension module 11. Therefore, a potential state of the connection port (11e) is Vcc Level. Therefore, an input potential to a connection port (11f) of an FPGA (7c) due to a first potential signal (S1) is High Level, the discrimination bit (12c) is "1" and the CPU (13c) in the CPU module (5c) is set as a sub CPU. When the CPU (13c) is set as a sub CPU, the setting information (the information that the CPU (13c) is a sub CPU) is stored as definition information (Qc) in the memory (8c). When the control program (P) is executed, an operation clock signal of the CPU module (5c) as a sub CPU is synchronized with a clock signal from the CPU module (5a) as a main CPU.

The CPU module (5c) has an output port (11g). A potential state (predetermined potential state) of a second potential signal (S2) that is output from the output port (11g) is Vcc. The CPU module (5d) has therein an FPGA (7d). The output port (11g) is connected to a connection port (11h) of the FPGA (7d). A potential state of the output port (11g) is a Vcc Level. Therefore, the potential state of the second potential signal (S2) that is input to the connection port (11h) is High Level.

The CPU module (5d) has a discrimination bit (12d) in a memory (8d). The discrimination bit (12d) has configuration and function that are the same as those of the discrimination bit (12a). In the CPU module (5d), the potential state of the second potential signal (S2) that is input to the connection port (11h) of the FPGA (7d) is High Level. Therefore, the discrimination bit (12d) is "1" and the CPU (13d) in the CPU module (5d) is set as a sub CPU (the CPU (13d) is a sub CPU that is dependently connected to the CPU module (5c) as a sub CPU, and thus may be referred to as a sub-sub CPU in order to be distinguished from the CPU module (5c) as a sub CPU). When the CPU (13d) is set as a sub CPU, the setting information (the information that the CPU (13d) is a sub CPU) is stored as definition information (Qd) in the memory (8d). When the control program (P) is executed, an operation clock signal of the CPU module (5d) as a sub CPU is synchronized with a clock signal from the CPU module (5a) as a main CPU.

A CPU in the CPU module (5e) in the CPU rack (R3) is also set as a sub CPU, similar to the CPU (13c) in the CPU module (5c) in the CPU rack (R2). Further, a CPU in the CPU module (5f) in the CPU rack (R3) is also set as a sub CPU (sub-sub CPU), similar to the CPU (13d) in the CPU module (5d) in the CPU rack (R2). Configurations and setting processes of these are the same as those described regarding the CPU rack (R3) in the third embodiment and those described in FIG. 12, and thus a detailed description thereof is omitted.

According to a programmable controller of the multi-CPU configuration, multi-tasking becomes possible, and load balancing and high speed processing are realized. Further, multiple applications are divided according to functionality and are processed by multiple CPUs. Thereby, complicated processing is avoided and simplified high-speed processing is achieved.

When a system processor has a code switch for identifying each of the CPU modules, by setting the code switches, one CPU module can be distinguished from other CPU modules.

However, in order to identify each of the CPUs, a switch is provided for each of the CPUs, and switch settings are purposely performed. Further, on a program side, it is declared which CPU is a main CPU and which CPU is a sub CPU. When there is a contradiction between the declaration on the program side and the settings (that is, the switch settings) of the main CPU and the sub CPU that are detected on a hardware side, there is a concern that the program may operate abnormally. The abnormal operation of the program can cause abnormal operation of a control object (such as a motor) of which operation is controlled by the programmable controller.

A programmable controller according to an embodiment of the present invention can automatically complete settings for main and sub CPUs by connecting multiple CPUs having the same configuration to a circuit, without the need of declaring which CPU is a main CPU and which CPU is a sub CPU in a program and without the need of performing switch settings. Further, a programmable controller according to an embodiment of the present invention can prevent abnormal operation of a program even when settings of a main CPU and a sub CPU have changed due to a change or the like in circuit connection.

A programmable controller according to an embodiment of the present invention includes multiple interface units and multiple CPU modules. Each of the interface units can connect to one of the CPU modules and can transmit a first potential signal having multiple different potential states toward the connected CPU module. Each of the CPU modules can connect to one of the interface units and can connect to another CPU module, and has therein a CPU for performing arithmetic processing and a memory for storing a discrimination bit and definition information. The discrimination bit has binarized information indicating whether the CPU in the CPU module that has the discrimination bit is a main CPU or a sub CPU based on the potential state of the first potential signal that is input to the CPU module from the interface unit to which the CPU module is connected. The definition information has setting information indicating whether the CPU in the CPU module that has the definition information is set in advance as a main CPU or as a sub CPU.

When one of the CPU modules is connected to another CPU module, the CPU module can transmit a second potential signal having a predetermined potential state toward the another CPU module. A discrimination bit in the another CPU module has binarized information indicating that the CPU of the CPU module is a sub CPU based on the potential state of the second potential signal.

The programmable controller may further include an error notification means that performs error notification when content of the binarized information that the discrimination bit in the CPU module has indicating whether the CPU of the CPU module is a main CPU or a sub CPU and content of the setting information that the definition information in the CPU module has indicating whether the CPU of the CPU module is a main CPU or a sub CPU do not match.

The programmable controller may limit execution of arithmetic processing by the CPU when content of the binarized information that the discrimination bit in the CPU module has indicating whether the CPU of the CPU module is a main CPU or a sub CPU and content of the setting information that the definition information in the CPU module has indicating whether the CPU of the CPU module is a main CPU or a sub CPU do not match.

When the definition information is not stored in the memory that the CPU module has, the programmable controller may create new definition information in the memory based on the content of the binarized information that the discrimination bit in the CPU module has indicating whether the CPU of the CPU module is a main CPU or a sub CPU.

The multiple CPU modules may generate clock signals that become timing references for execution of the arithmetic processing, and may cause a clock signal of a CPU module of which the CPU is indicated as a sub CPU by the binarized information that the discrimination bit has to be synchronized with a clock signal of a CPU module of which the CPU is indicated as a main CPU by the binarized information that the discrimination bit has.

According to an embodiment of the present invention, settings for main and sub CPUs can be automatically completed by connecting multiple CPUs having the same configuration to a circuit, without the need of declaring which CPU is a main CPU and which CPU is a sub CPU and without the need of performing switch settings. Further, abnormal operation of a program can be prevented even when settings of a main CPU and a sub CPU have changed due to a change or the like in circuit connection.

Obviously, numerous modifications and variations of the present invention are possible in light of the above teachings. It is therefore to be understood that within the scope of the appended claims, the invention may be practiced otherwise than as specifically described herein.

What is claimed is:

1. A programmable controller, comprising:
a plurality of interface circuitry modules; and
a plurality of CPU modules,
wherein an interface circuitry module of the interface circuitry modules is configured to transmit a potential signal having an electric potential state of a plurality of different electric potential states to a CPU module of the plurality of CPU modules, the CPU module is connectable to a second CPU module of the plurality of CPU modules and includes a CPU configured to perform arithmetic processing and a memory that is configured to store discrimination information and definition information, the discrimination information includes binarized information indicating whether the CPU in the CPU module is a main CPU or a sub CPU, the discrimination information is set based on the electric potential state of the potential signal that is input into the CPU module from the interface circuitry module to which the CPU module is connected, and the definition information includes setting information indicating whether the CPU in the CPU module is set in advance as the main CPU or the sub CPU, the CPU in the CPU module being set as the main CPU or the sub CPU based on whether the interface circuitry module includes a slave rack extension module, the CPU in the CPU module being set as the sub CPU when the CPU module is connected to the interface circuitry module and the interface circuitry module includes the slave rack extension module, and the CPU in the CPU module being set as the main CPU when the CPU module is connected to the interface circuitry module and the interface circuitry module does not include the slave rack extension module, and
wherein when the CPU module of the plurality of CPU modules is connected to the second CPU module of the plurality of CPU modules and the CPU in the CPU module is set as the sub CPU when the CPU module is connected to the interface circuitry module and the interface circuitry module includes the slave rack extension module, a second CPU of the second CPU module is also set as a sub CPU.

2. The programmable controller according to claim 1, wherein when the CPU module of the plurality of CPU modules is connected to the second CPU module of the plurality of CPU modules, the CPU module is configured to transmit a second potential signal having a predetermined electric potential state to the second CPU module, and second discrimination information in the second CPU module includes binarized information indicating that the second CPU of the second CPU module is set as the sub CPU, and the second discrimination information is set based on the predetermined electric potential state of the second potential signal.

3. The programmable controller according to claim 1, further comprising:
error notification circuitry configured to perform error notification when the binarized information of the discrimination information in the CPU module that indicates whether the CPU of the CPU module is the main CPU or the sub CPU does not match setting information for the CPU module that indicates whether the CPU of the CPU module is the main CPU or the sub CPU.

4. The programmable controller according to claim 1, wherein execution of the arithmetic processing by the CPU is limited when the binarized information of the discrimination information in the CPU module, which indicates whether the CPU of the CPU module is the main CPU or the sub CPU, does not match setting information for the CPU module that indicates whether the CPU of the CPU module is the main CPU or the sub CPU.

5. The programmable controller according to claim 1, wherein when the definition information is not stored in the memory of the CPU module, new definition information is created in the memory based on the binarized information of the discrimination information in the CPU module that indicates whether the CPU of the CPU module is the main CPU or the sub CPU.

6. The programmable controller according to claim 1, wherein the CPU module of the plurality of CPU modules is configured to generate a clock signal that is a timing reference for execution of the arithmetic processing, and when the clock signal of the CPU module has the CPU, which is indicated as the sub CPU by the binarized information of the discrimination information, the clock signal of the CPU module is synchronized with a second clock signal of the second CPU module having the second CPU, which is indicated as the main CPU by second binarized information of second discrimination information.

7. The programmable controller according to claim 2, further comprising:
error notification circuitry configured to perform error notification when the binarized information of a discrimination bit in the CPU module, which indicates whether the CPU of the CPU module is the main CPU or the sub CPU, does not match setting information for the CPU module, which indicates whether the CPU of the CPU module is the main CPU or the sub CPU.

8. The programmable controller according to claim 2, wherein execution of the arithmetic processing by the CPU is limited when the binarized information of a discrimination bit in the CPU module, which indicates whether the CPU of the CPU module is the main CPU or the sub CPU, does not match setting information for the CPU module, which indicates whether the CPU of the CPU module is the main CPU or the sub CPU.

9. The programmable controller according to claim 2, wherein when the definition information is not stored in the memory of the CPU module, new definition information is created in the memory based on the binarized information of the discrimination information in the CPU module, which indicates whether the CPU of the CPU module is the main CPU or the sub CPU.

10. The programmable controller according to claim 2, wherein the second CPU module of the plurality of CPU modules is configured to generate a second clock signal that is a timing reference for execution of the arithmetic processing, and when the second clock signal of the second CPU module has the second CPU, which is indicated as the sub CPU by second binarized information of second discrimination information, the second clock signal is synchronized with a clock signal of the CPU module having the CPU, which is indicated as the main CPU by the binarized information of the discrimination information.

11. The programmable controller according to claim 3, wherein execution of the arithmetic processing by the CPU is limited when the binarized information of the discrimination information in the CPU module, which indicates whether the CPU of the CPU module is the main CPU or the sub CPU, does not match the setting information for the CPU module that indicates whether the CPU of the CPU module is the main CPU or the sub CPU.

12. The programmable controller according to claim 3, wherein when the definition information is not stored in the memory of the CPU module, new definition information is created in the memory based on the binarized information of the discrimination information in the CPU module, which indicates whether the CPU of the CPU module is the main CPU or the sub CPU.

13. The programmable controller according to claim 3, wherein the CPU module of the plurality of CPU modules is configured to generate a clock signal that is a timing reference for execution of the arithmetic processing, and when the clock signal of the CPU module has the CPU, which is indicated as the sub CPU by the binarized information of the discrimination information, the clock signal is synchronized with a second clock signal of the second CPU module having the second CPU, which is indicated as the main CPU by second binarized information of second discrimination information.

14. The programmable controller according to claim 4, wherein when the definition information is not stored in the memory of the CPU module, new definition information is created in the memory based on the binarized information of the discrimination information in the CPU module, which indicates whether the CPU of the CPU module is the main CPU or the sub CPU.

15. The programmable controller according to claim 4, wherein the CPU module of the plurality of CPU modules is configured to generate a clock signal that is a timing reference for execution of the arithmetic processing, and when the clock signal of the CPU module has the CPU, which is indicated as the sub CPU by the binarized information of the discrimination information, the clock signal is synchronized with a second clock signal of the second CPU module having the second CPU, which is indicated as the main CPU by second binarized information of second discrimination information.

16. The programmable controller according to claim 5, wherein the CPU module of the plurality of CPU modules is configured to generate a clock signal that is a timing reference for execution of the arithmetic processing, and when the clock signal of the CPU module has the CPU, which is indicated as the sub CPU by the binarized information of the discrimination information, the clock signal is synchronized with a second clock signal of the second CPU module having the second CPU, which is indicated as the main CPU by second binarized information of second discrimination information.

17. A method for controlling a servo motor, comprising:
executing arithmetic processing via a plurality of CPU modules connected to a plurality of interface circuitry modules;
generating a control command based on the arithmetic processing; and
transmitting the control command to a servo control device that executes operation and control of a servo motor,
wherein the method further comprises transmitting, by an interface circuitry module of the interface circuitry modules, a potential signal having an electric potential state of a plurality of different electric potential states to a CPU module of the plurality of CPU modules, the CPU module is connectable to a second CPU module of the plurality of CPU modules and includes a CPU configured to perform arithmetic processing and a memory that is configured to store discrimination information and definition information, the discrimination information includes binarized information indicating whether the CPU in the CPU module is a main CPU or a sub CPU, the discrimination information is set based on the electric potential state of the potential signal that is input into the CPU module from the interface circuitry module to which the CPU module is connected, and the definition information includes setting information indicating whether the CPU in the CPU module is set in advance as the main CPU or the sub CPU, the CPU in the CPU module being set as the main CPU or the sub CPU based on whether the interface circuitry module includes a slave rack extension module, the CPU in the CPU module being set as the sub CPU when the CPU module is connected to the interface circuitry module and the interface circuitry module includes the slave rack extension module, the CPU in the CPU module being set as the main CPU when the CPU module is connected to the interface circuitry module and the interface circuitry module does not include the slave rack extension module, and when the CPU module of the plurality of CPU modules is connected to the second CPU module of the plurality of CPU modules and the CPU in the CPU module is set as the sub CPU when the CPU module is connected to the interface circuitry module and the interface circuitry module includes the slave rack extension module, a second CPU of the second CPU module is also set as a sub CPU.

18. The method for controlling a servo motor according to claim 17, wherein when the CPU module of the plurality of CPU modules is connected to the second CPU module of the plurality of CPU modules, the CPU module is configured to transmit a second potential signal having a predetermined electric potential state to the second CPU module, and second discrimination information in the second CPU module includes binarized information indicating that the second CPU of the second CPU module is set as the sub CPU, and the second discrimination information is set based on the predetermined electric potential state of the second potential signal.

19. The method for controlling a servo motor according to claim 17, further comprising:
notifying error when the binarized information of the discrimination information in the CPU module that indicates whether the CPU of the CPU module is the main CPU or the sub CPU does not match setting information for the CPU module that indicates whether the CPU of the CPU module is the main CPU or the sub CPU.

20. The method for controlling a servo motor according to claim 17, wherein execution of the arithmetic processing by the CPU is limited when the binarized information of the discrimination information in the CPU module, which indicates whether the CPU of the CPU module is the main CPU or the sub CPU, does not match setting information for the CPU module that indicates whether the CPU of the CPU module is the main CPU or the sub CPU.

* * * * *